(12) United States Patent
Masleid et al.

(10) Patent No.: US 7,689,963 B1
(45) Date of Patent: Mar. 30, 2010

(54) DOUBLE DIAMOND CLOCK AND POWER DISTRIBUTION

(76) Inventors: Robert P. Masleid, 17266 Eaton La., Monte Sereno, CA (US) 95930; Scott Pitkethly, 435 Avenue Del Ora, Redwood City, CA (US) 94062

( * ) Notice: Subject to any disclaimer, the term of this patent is extended or adjusted under 35 U.S.C. 154(b) by 440 days.

(21) Appl. No.: 11/477,970

(22) Filed: Jun. 28, 2006

Related U.S. Application Data

(63) Continuation-in-part of application No. 11/171,668, filed on Jun. 30, 2005, and a continuation-in-part of application No. 11/274,098, filed on Nov. 14, 2005.

(51) Int. Cl.
*G06F 17/50* (2006.01)
*H03K 3/00* (2006.01)
*H01L 21/82* (2006.01)

(52) U.S. Cl. .................. 716/13; 257/E23.151; 327/295

(58) Field of Classification Search ................ 257/758, 257/762, 765, 773, 776, 780, E23.151; 327/295; 716/13
See application file for complete search history.

(56) References Cited

U.S. PATENT DOCUMENTS

| | | | |
|---|---|---|---|
| 5,272,600 A * | 12/1993 | Carey | ........................... 361/792 |
| 5,416,861 A | 5/1995 | Koh et al. | |
| 6,400,230 B2 | 6/2002 | Fairbanks | |
| 6,538,957 B2 | 3/2003 | Magoshi | |
| 6,696,863 B2 | 2/2004 | Yamamoto et al. | |
| 6,711,727 B1 | 3/2004 | Teig et al. | |
| 2002/0162079 A1 | 10/2002 | Igarashi et al. | |
| 2003/0127241 A1 | 7/2003 | Russell et al. | |
| 2003/0209766 A1 * | 11/2003 | Blanchard | ................... 257/390 |
| 2004/0044983 A1 | 3/2004 | Dillon et al. | |
| 2005/0023705 A1 * | 2/2005 | Campbell et al. | ........... 257/786 |
| 2005/0138593 A1 | 6/2005 | Okumura | |
| 2005/0280159 A1 | 12/2005 | Okumura | |
| 2007/0136707 A1 | 6/2007 | Teig et al. | |

OTHER PUBLICATIONS

Final Office Action, Mail Date Mar. 23, 2009; U.S. Appl. No. 11/274,098.
Non Final Office Action, Mail Date Jul. 9, 2009; U.S. Appl. No. 11/274,098.
Non Final Office Action, Mail Date Oct. 7, 2008; U.S. Appl. No. 11/274,098.

* cited by examiner

*Primary Examiner*—Thomas L Dickey

(57) ABSTRACT

Systems and methods of double diamond clock and power distribution. In accordance with a first embodiment of the present invention, an integrated circuit comprises a first metallization layer. that is substantially a power plane and a second metallization layer disposed immediately adjacent to the first metallization layer. The first metallization layer and the second metallization layer are separated by an inter-plane distance. A signal trace on the first metallization layer is separated from the power plane by about three times the inter-plane distance.

21 Claims, 10 Drawing Sheets

DOUBLE DIAMOND CLOCK AND POWER DISTRIBUTION

RELATED APPLICATIONS

This application is a Continuation-in-Part of co-pending, commonly owned U.S. patent application Ser. No. 11/171,668, filed Jun. 30, 2005, entitled "Clock Signal Distribution System and Method" to Pitkethly, which is hereby incorporated herein by reference in its entirety.

This application is a Continuation-in-Part of co-pending, commonly owned U.S. patent application Ser. No. 11/274,098, filed Nov. 14, 2005, entitled "Non-Rectilinear Routing in Rectilinear Mesh" to Masleid, which is hereby incorporated herein by reference in its entirety.

FIELD OF THE INVENTION

The present invention relates to the field of integrated circuit fabrication. More particularly the present invention relates to distributing power and routing signal traces in an integrated circuit.

BACKGROUND

Electronic devices and systems have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. These electronic devices often include integrated circuits that perform variety of functions. In numerous implementations, operations performed by the integrated circuits are synchronized by clock or other high speed signals. However, routing constraints can make clock signal distribution in conventional clock distribution systems a formidable task.

SUMMARY

Accordingly, systems and methods for improved clock signal distribution and power distribution in circuit layout design are needed. For instance, systems and methods of double diamond clock and power distribution are needed. In addition, systems and methods of non-rectilinear double diamond signal routing and power distribution in a rectilinear mesh would be advantageous. Further, systems and methods of double diamond clock and power distribution that are compatible and complimentary with conventional integrated circuit layout systems and methods are highly desired.

Systems and methods of double diamond clock and power distribution are disclosed. In accordance with a first embodiment of the present invention, an integrated circuit comprises a first metallization layer, that is substantially a power plane and a second metallization layer disposed immediately adjacent to the first metallization layer. The first metallization layer and the second metallization layer are separated by an inter-plane distance. A signal trace on the first metallization layer is separated from the power plane by about three times the inter-plane distance.

In accordance with another embodiment of the present invention, an integrated circuit comprises a first substantially continuous metallization layer comprising stripes that are non-parallel to an edge of the integrated circuit. The integrated circuit may comprise a second substantially continuous metallization layer comprising gaps to accommodate coupling the first substantially continuous metallization layer to other layers of said integrated circuit.

In accordance with yet another embodiment of the present invention, an integrated circuit comprises a first substantially continuous metallization layer for conducting first power to elements of said integrated circuit and a second substantially continuous metallization layer for conducting second power to elements of said integrated circuit. The first and second substantially continuous metallization layers may be adjacent. The first and second substantially continuous metallization layers comprise stripes that are non-parallel to an edge of said integrated circuit. The first substantially continuous metallization layer comprises a signal trace that is electrically isolated from the first power.

In accordance with still another embodiment of the present invention, a computer usable media comprises a plurality of tile representations for the layout of metal layers of an integrated circuit. The plurality of tile representations comprise a first representation for creating non-rectilinear stripes in a rectilinear mesh.

DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

DETAILED DESCRIPTION

Figure 1:
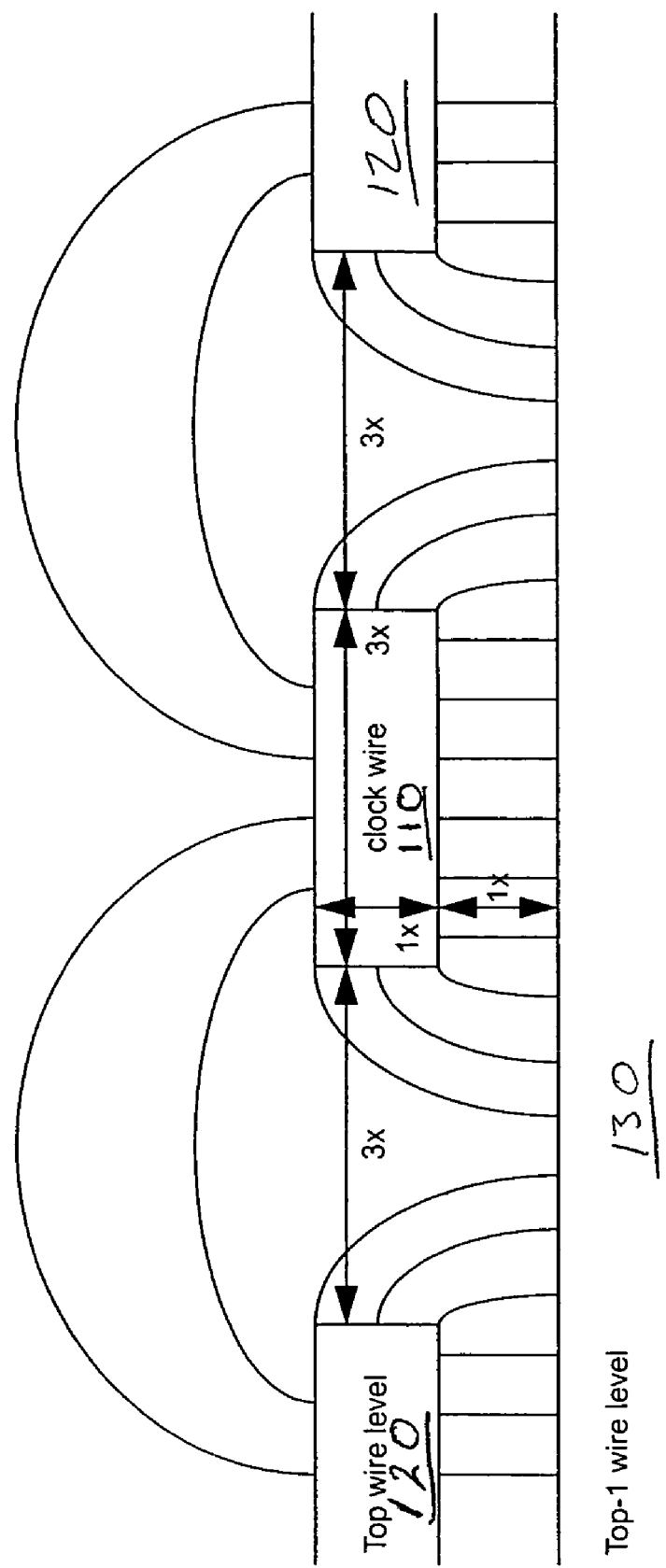
FIG. 1 illustrates a side sectional view of "fast geometry" clock wires or traces, in accordance with embodiments of the present invention.

Reference will now be made in detail to preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Most conventional art computer aided design (CAD) systems for the layout of an integrated circuit are based upon a building block approach. One type of "building block" is generally known or referred to as a "tile." A tile is generally a geometric object, e.g., a square element, represented graphically, that is used to populate a plane, e.g., to create planar geometric shapes. Tiles placed according to a rectilinear grid, e.g., as square tiles on a floor, are commonly used to define integrated circuit features, particularly for metallization layers. A plurality of tiles, or tile representations, are stored in computer readable media of a CAD system.

Metallization layers of an integrated circuit are used predominately to couple semiconductor features. Such couplings generally take a form of one or more "traces." A trace is generally a long, narrow strip of metallization, roughly analogous to a wire. In general, a first metallization layer will comprise traces oriented in a direction parallel to an edge of an integrated circuit. There will generally be at least a second metallization layer comprising traces oriented in a direction perpendicular to the first layer's direction. It is appreciated that the orientation of traces on the second layer, while perpendicular to the direction of traces on the first layer, are nevertheless parallel to an edge of the integrated circuit.

A particular coupling, e.g., an electrical coupling between two circuit elements as represented schematically by a line (wire), may comprise a plurality of traces on multiple layers. For example, the coupling may be routed in a first direction on one level and in a perpendicular direction on another layer. Such changes of direction and layers may be repeated multiple times until the two terminals are coupled.

Due to the square nature of tiles and the rectilinear grid system within most CAD systems, such rectilinear layout of traces is straight-forward and intuitive. Moreover, the automated placement and routing systems of such CAD systems are highly biased, and frequently are exclusively limited, to rectilinear placement and routing.

Embodiments in accordance with the present invention may comprise offset diagonal (or at other angles) clock signal distribution path symmetries that facilitate high speed and/or low clock-skew clock distribution, as described in greater detail in co-pending, commonly owned U.S. patent application Ser. No. 11/171,668, filed Jun. 30, 2005, entitled "Clock Signal Distribution System and Method" to Pitkethly, incorporated herein by reference in its entirety. For example, offset diagonal distributions may ensure endpoints are equidistant from central clock signal sources. Such diagonal clock signal distribution routes reduce relative distance from the driver to the endpoint compared to traditional non-diagonal clock signal distribution routes. Embodiments of the present invention also facilitate maximized placement of clock signal distribution routes in a single metal layer (e.g., a top metal layer).

Maximized placement of clock signal routes in a single layer facilitates realization of numerous increased performance advantages. Implementations of the present invention emphasize formation of the clock signal distribution tree in the single layer. A single layer route provides for a more uniform electrical medium (e.g., one that is less influenced by process variations between the different layers). Placing clock distribution tree resources in the top metal layer can offer a number of advantages. For example, top metal layer emphasized implementations of the present invention can have one side exposed to air or plastic providing for less overall parasitic capacitance. The present invention offset diagonal clock signal distribution tree also facilitates convenient avoidance of other components included in a metal layer. For example, a present invention offset diagonal clock distribution tree facilitates the avoidance of pads in the top metal layer. Embodiments of the present invention can also enable reduced "doubling back" which can be relatively costly and impractical, especially if pads are conforming to an orthogonal array.

In some instances, however, integrated circuit features such as pad stacks for ball grid array (BGA) balls, e.g., Controlled Collapse Chip Connect (C4) "bumps," and/or power plane mesh tiles may become obstacles that limit the number and spacing of global clock branches.

FIG. 1 illustrates a side sectional view of "fast geometry" clock wires or traces, in accordance with embodiments of the present invention. Fast geometry clock wire 110 is disposed in the top layer of metal, e.g., comprising Aluminum or Copper, 120 of an integrated circuit, for example, embedded into a metal layer that serves primarily as a power or ground plane. As illustrated in FIG. 1, fast geometry clock wire 110 is separated from an adjacent metal layer 130 by about its thickness (vertical dimension in FIG. 1), and separated from other portions of metallization layer 120 (horizontal dimension in FIG. 1) by about three times the inter-plane distance, e.g., the separation between metal layer 120 and adjacent metal layer 130. For an exemplary semiconductor manufacturing process, fast geometry clock wire 110 is about 1 μm thick, about 3 μm wide, separated from other portions of metal layer 120 by about 3 μm and separated from adjacent metal layer 130 by about 1 μm.

FIG. 1 also illustrates electrical field lines coupling fast geometry clock wire 110 with surrounding metal features (120, 130) of an integrated circuit. It is to be appreciated that top surface capacitance is nearly zero, as there is no metal above fast geometry clock wire 110, and field paths to adjacent features of layer 120 are relatively long. In addition, line to line capacitance is nearly zero, as portions of fast geometry clock wire 110 adjacent to other features of layer 120 are approximately three times distant relative to their thickness, forming very weak capacitive structures.

A further advantage conveyed by forming fast geometry clock wire 110 in a top layer of metal is that such top metal layers are generally thicker than other metal layers of an integrated circuit. For example, metal layer 120 may generally be thicker than metal layer 130. Such relatively greater metal thickness advantageously reduces resistance of fast geometry clock wire 110, beneficially reducing insertion delay of a signal carried on fast geometry clock wire 110 due to RC. It is also believed that such a top layer of metallization is characterized as having less statistical process variation than other metal layers. Consequently, the skew of signals carried on fast geometry clock wire 110 due to process variation is desirably decreased. However, it is to be appreciated that embodiments in accordance with the present invention are well suited to routing signal wires on non-top metal layers.

It is to be appreciated that increasing the width of fast geometry clock wire 110 will generally not produce a significant improvement in RC per unit length of the trace. For example, while increasing the width of fast clock wire 110 will decrease resistance (R), such increased width also increases capacitance (C) at about the same rate, e.g., due to coupling with metal layer 130. Consequently, the RC per unit length remains about constant for increased widths. Increased width of fast clock wire 110 will increase signal power, and may be utilized to improve propagation delay of a total signal line through utilizing a relatively wider trace near a driving buffer and a relatively narrower trace closer to the receiver(s).

In accordance with embodiments of the present invention, orienting both the layout mesh and the bump grid into a pair of coordinated diamond lattices enables increased clock route locations and minimizes mesh disruption by clock routes.

Figure 2:
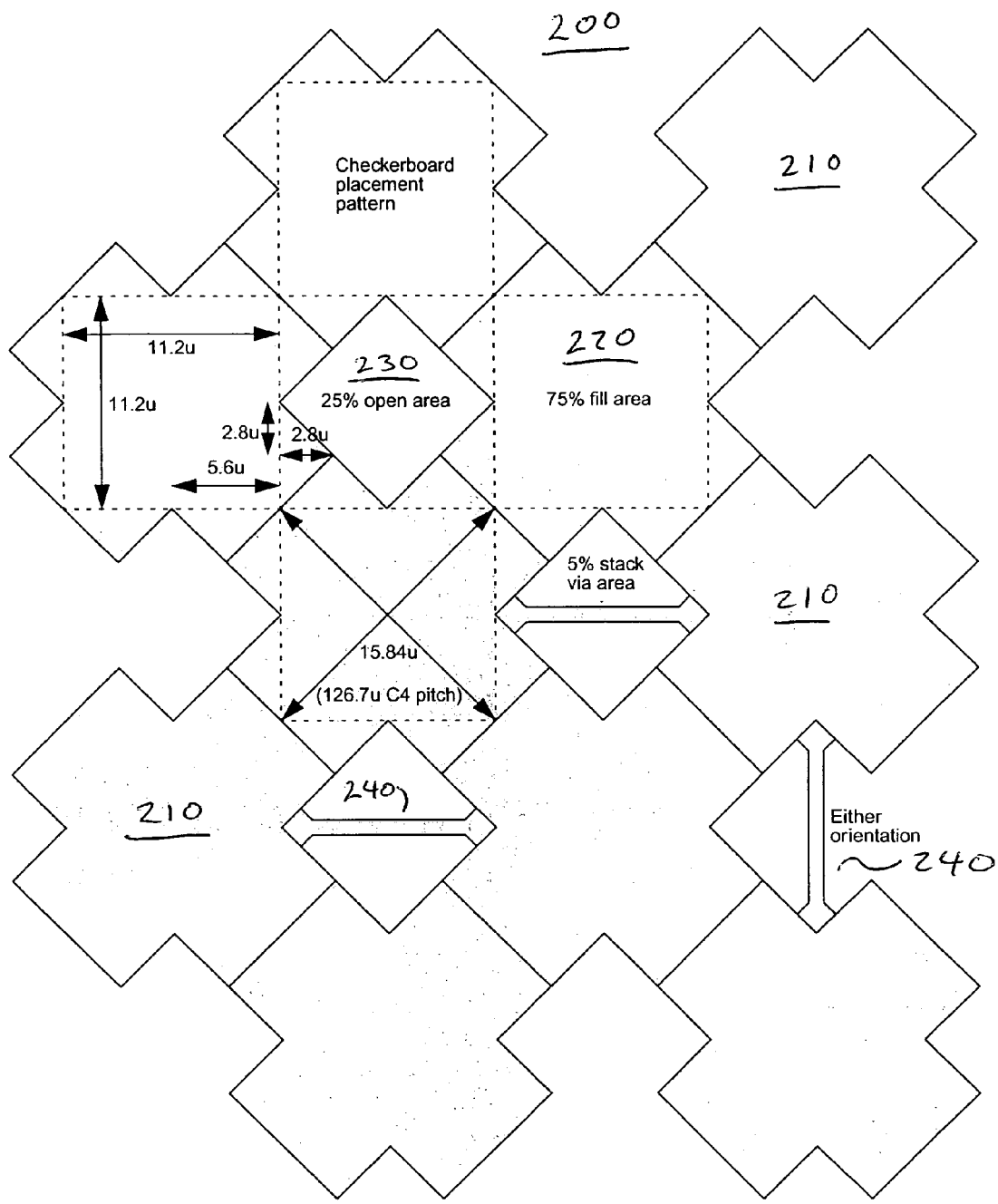
FIG. 2 illustrates a portion of a plane, in accordance with embodiments of the present invention.

FIG. 2 illustrates a plan view of a portion of a plane 200, in accordance with embodiments of the present invention. Plane 200 may be, for example, a plane for distributing ground, Vss, or operating power, Vdd, or other widely used voltage or signal. In FIG. 2, dark or shaded areas represent metal and light areas represent no metal. Plane 200 may comprise large areas of a metal layer, e.g., large in comparison to typical trace widths of the integrated circuit, or substantially all of a metal layer. Plane 200 is formed in a metallization layer of an integrated circuit, in accordance with a graphical pattern made up of tiles arrayed in a rectilinear mesh or grid. Plane 200 comprises a plurality of substantially similar instances of tile 210. Exemplary dimensions are shown as indicated.

In general, integrated circuit design rules limit the density of metallization. The metal 220 and no metal 230 areas of plane 200 are intended to comply with such rules in an electrically advantageous manner. The design of tile 210 should approach the design rule metal density limit such that, for example, plane 200 achieves a desirable density, e.g., at least 90 percent of the density limit.

For example, if a metal density limit for a metallization layer is 80 percent, e.g., no more than 80% of the layer may be metal, then tile 210, with a 75 percent fill area achieves approximately 94 percent of the density limit.

In accordance with embodiments of the present invention, instances of tile 210 may be laid out on a rectilinear grid, e.g., a grid parallel to edges of an integrated circuit, for example as described in co-pending, commonly owned U.S. patent application Ser. No. 11/274,098, filed Nov. 14, 2005, entitled "Non-Rectilinear Routing in Rectilinear Mesh" to Masleid, incorporated herein by reference in its entirety. Alternatively, instances of tile 210 may be laid out on a non-rectilinear grid, e.g., a grid oriented at an angle, e.g., 45 degrees, to edges of an integrated circuit.

Plane 200 also comprises a plurality of jumpers 240. Jumpers 240 are generally oriented at a complementary angle to the grid formed by tiles 210. For example, jumpers 240 may be vertical or horizontal as shown in the alignment of FIG. 2. As will be described further below, jumpers 240 may provide for coupling of plane 200 to other layers of the integrated circuit.

It is to be appreciated that the plurality of "X" shaped tiles, e.g., tile 210, of plane portion 200 produces a series of diagonal parallel stripes when placed. Such stripes are not parallel to a rectilinear layout grid or to an edge of an integrated circuit.

It is appreciated that an integrated circuit generally comprises many, e.g., eight or more, metal layers dedicated to signal routing, in addition to two or more layers generally dedicated to power and ground. These layers generally route signals in a rectilinear manner, e.g., parallel to the edges of the integrated circuit. Frequently, a single layer is dedicated, or mostly dedicated, to wire routes in a single orientation, e.g., either horizontal or vertical in plan view. Further, the semiconductor devices of the integrated circuit are generally laid out on a rectilinear grid.

In accordance with embodiments of the present invention, distributing power in diagonal parallel stripes advantageously enables many opportunities to "cross" a desired trace or device feature located on another layer of the integrated circuit. Such crossings are utilized to "drop down" from the power plane to couple to the desired trace or feature, e.g., with a via structure. The inclusion of signal traces in a power plane layer interrupts the power plane, and limits opportunities to drop down from the power plane. Such interruptions have much less impact on the capability of present invention angled stripes to cross a desired trace or device feature, in comparison to the conventional art.

Figure 3:
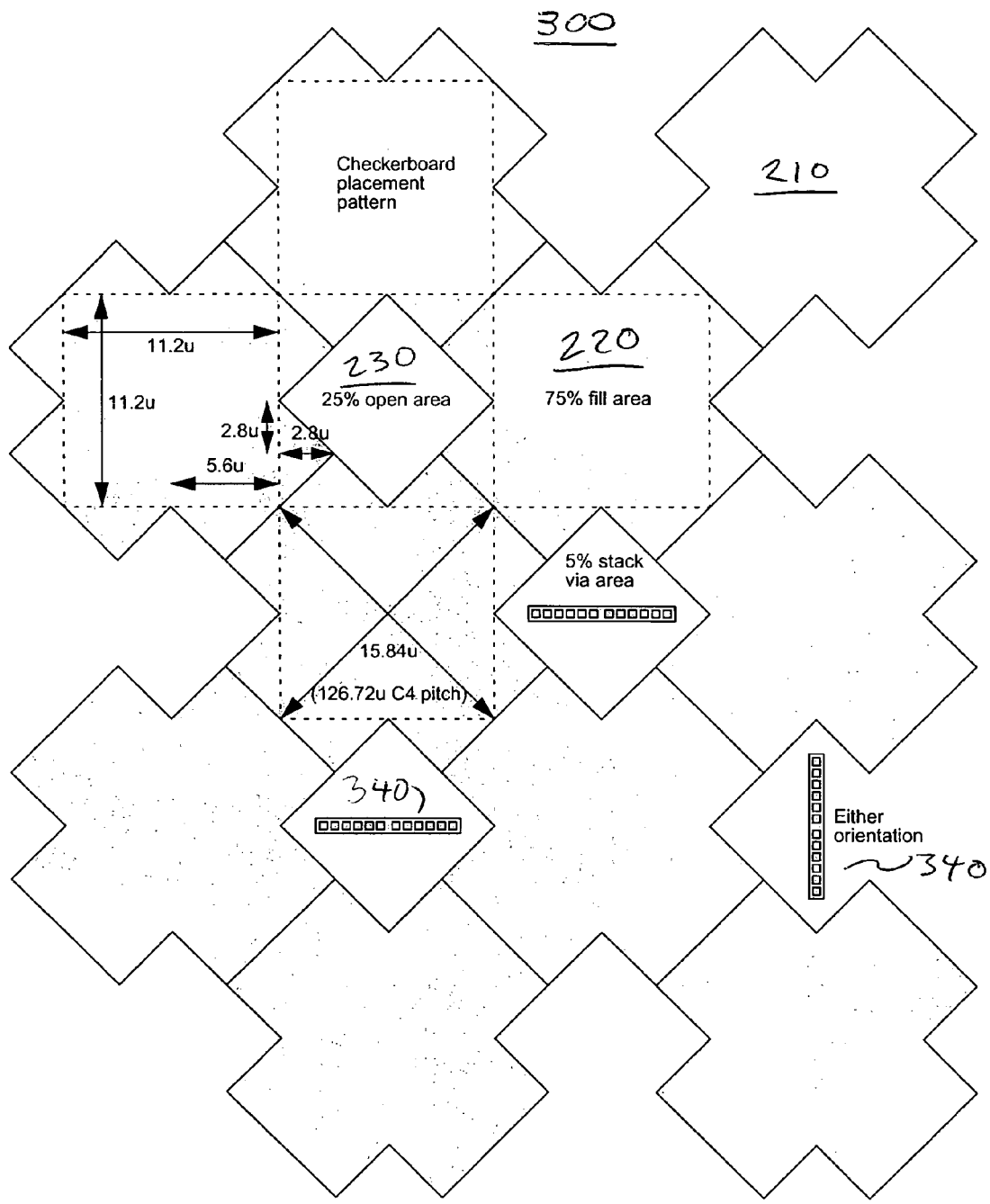
FIG. 3 illustrates a portion of another plane, in accordance with embodiments of the present invention.

FIG. 3 illustrates a plan view of a portion of a plane 300, in accordance with embodiments of the present invention. Plane 300 may be, for example, a plane for distributing ground, Vss, or operating power, Vdd, or other widely used voltage or signal. In general, plane 300 is adjacent to plane 200 (FIG. 2) and provides for complementary signals. For example, if plane 200 is a power plane, plane 300 may be a Vss (ground) plane. In FIG. 3, dark or shaded areas represent metal and light areas represent no metal. Plane 300 may comprise large areas of a metal layer, e.g., large in comparison to typical trace widths of the integrated circuit, or substantially all of a metal layer. Plane 300 is formed in a metallization layer of an integrated circuit, in accordance with a graphical pattern made up of tiles arrayed in a rectilinear mesh or grid. Plane 300 comprises a plurality of substantially similar instances of tile 210. Exemplary dimensions are shown as indicated Planes 200 (FIG. 2) and 300 are generally vertically aligned in an integrated circuit, for example, such that filled areas (220) and open areas (230) correspond on both layers.

The jumpers 240 of FIG. 2 are aligned with vias 340 to provide for a connection from plane 200 through and electrically isolated from plane 300 to lower levels, e.g., other metal layers, of an integrated circuit.

Figure 4:
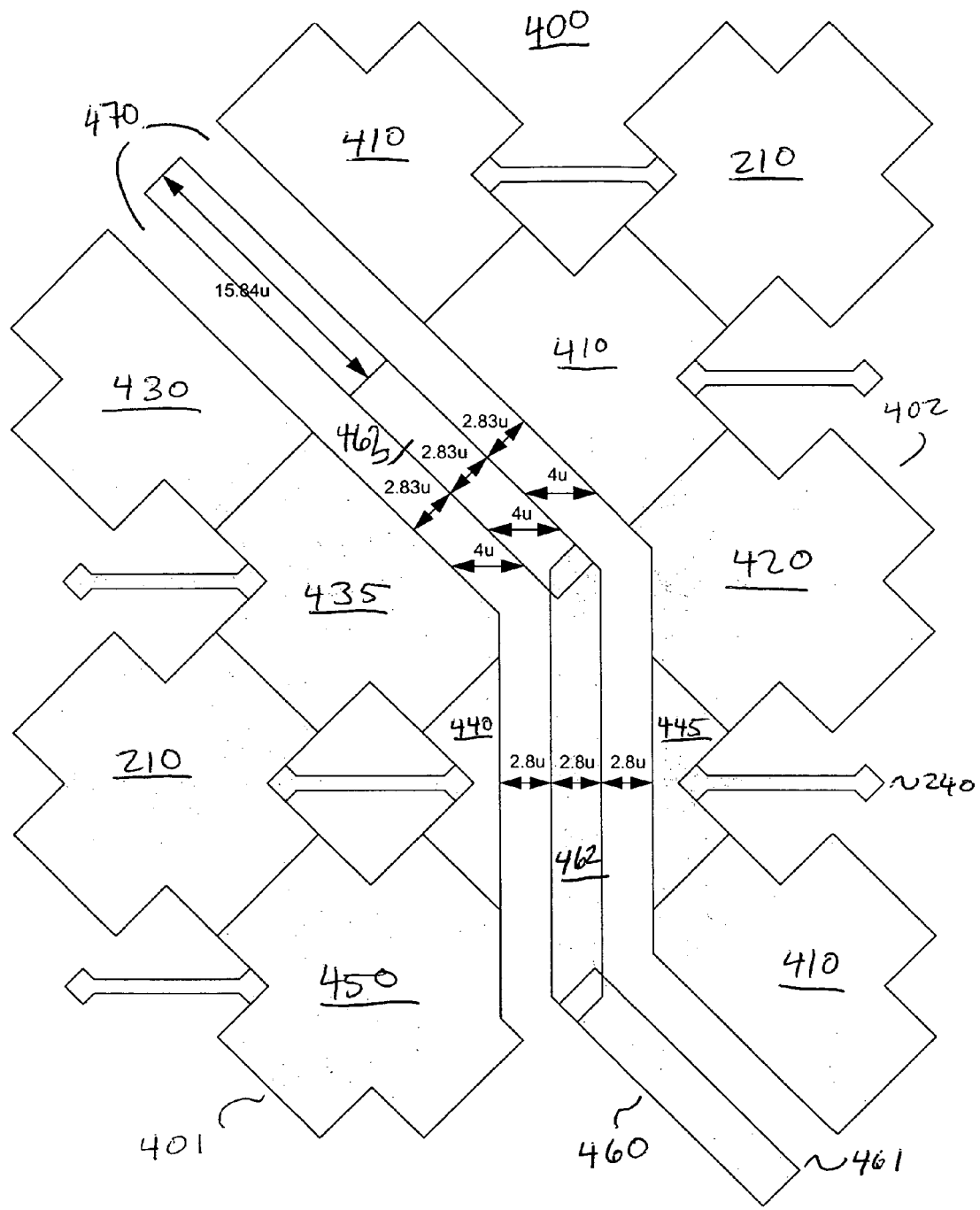
FIG. 4 illustrates a portion of yet another plane, in accordance with embodiments of the present invention.

FIG. 4 illustrates a plan view of a portion of a plane 400, in accordance with embodiments of the present invention. Plane 400 may be, for example, a plane for distributing ground, Vss, or operating power, Vdd, or other widely used voltage or signal. In FIG. 4, dark or shaded areas represent metal and light areas represent no metal. Plane 400 is formed in a metallization layer of an integrated circuit, in accordance with a graphical pattern made up of tiles arrayed in a rectilinear mesh or grid. Plane 400 comprises a plurality of instances of a variety of tile shapes, including tile 210. Exemplary dimensions are shown as indicated.

In addition to tiles 210, plane 400 comprises tiles 410, 420, 430, 435, 440, 445 and 450. In general, tiles 410, 420, 430, 435, 440, 445 and 450 may be formed by removing metal from the pattern of tile 210. It is also appreciated that certain of these tiles have image relationships with other tiles. For example, tiles 410 and 430 may be mirror images.

The exemplary arrangement of tiles shown in FIG. 4 forms a wiring channel 470 in the midst of plane 400. As illustrated in FIG. 4, wiring channel 470 is about 8.5 μm wide (3×2.83 em).

The creation of wiring channel 470 enables trace 460 to be placed in plane 400, as illustrated. It is appreciated that trace 460 comprises rectilinear segments, e.g., segment 462, and non-rectilinear segments, e.g., diagonal segment 461.

It is to be appreciated that trace 460 generally corresponds to the dimensions of fast geometry clock wire 110 as described in FIG. 1. For example, the spacing between trace 460 and adjacent portions of plane 400 is about three times an inter-plane spacing between plane 400 and an adjacent plane. In accordance with embodiments of the present invention, the thickness of plane 400 and trace 460 may be about one third of this dimension, e.g., about 0.94 μm.

It is to be appreciated that portion 401 of plane 400 is isolated from portion 402 of plane 400 for the length of wiring channel 470. Such a separation of a power plane is generally a disadvantageous construction, as such gaps in planes generally deleteriously increase resistance and inductance for power distribution and detrimentally create loop currents for return signal paths.

In accordance with embodiments of the present invention, trace and/or gap widths may be designed such that rectilinear dimensions of such widths are rational, e.g., integer, multiples of a rectilinear grid granularity. For example, a grid granularity may be 0.1 µm. In the exemplary embodiment of FIG. 4, segment 463 of trace 460 is illustrated as being 2.83 µm wide. However, the horizontal rectilinear component of segment 462 is 4 µm wide, an integral multiple of the grid granularity. Elsewhere, segment 462 of trace 460 is 2.8 µm wide, an integral multiple of the grid granularity. Likewise, wiring channel 470 is about 8.5 µm wide in the region of segment 463. However, the horizontal rectilinear component of wiring channel 470 in the region of segment 463 is 12 µm wide, an integral multiple of the grid granularity. Elsewhere, wiring channel 470 in the region of segment 462 is about 8.4 µm wide, an integral multiple of the grid granularity. Such construction may facilitate alignment of non-rectilinear features, e.g., of plane 400, with rectilinearly aligned features in other layers of an integrated circuit.

Figure 5:
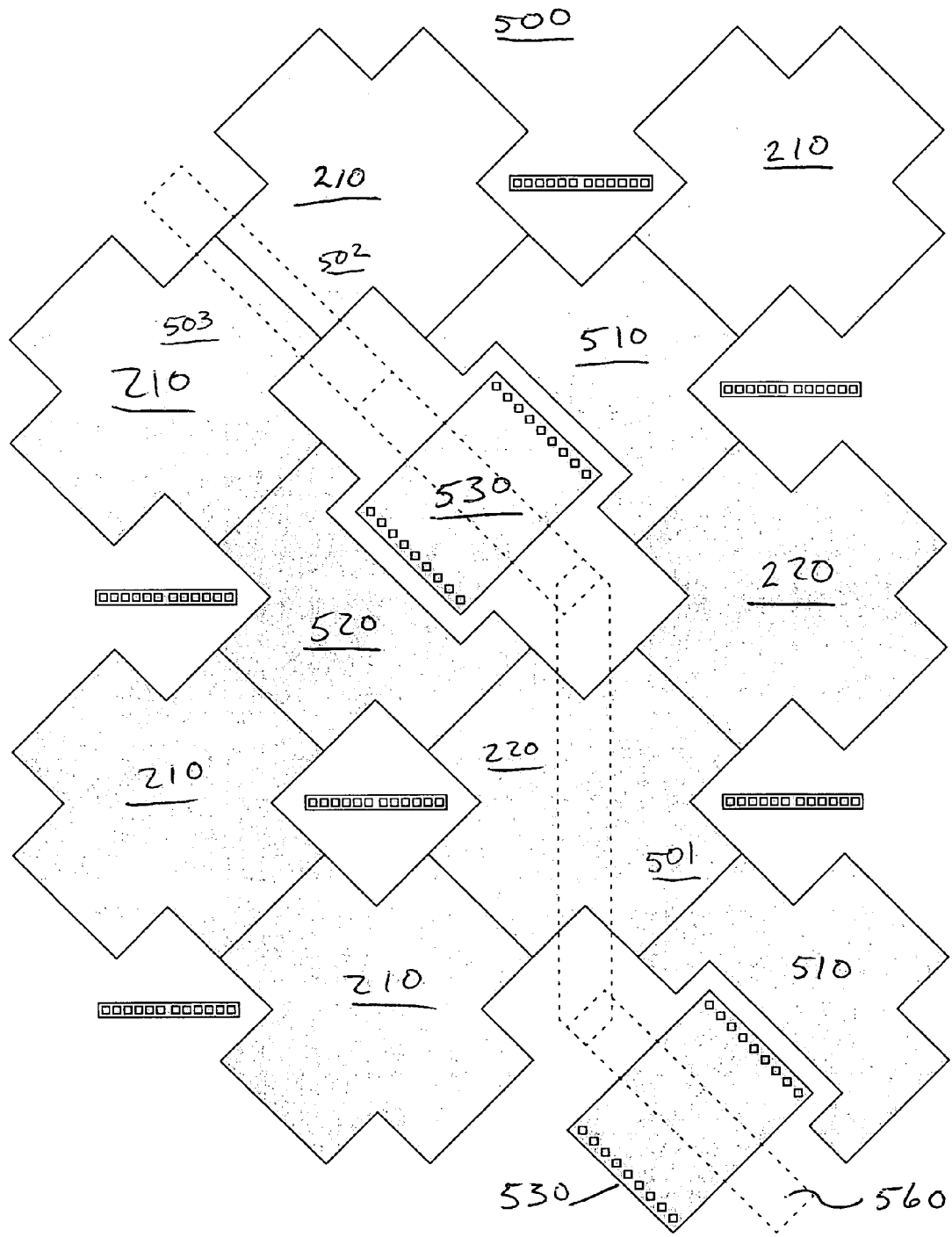
FIG. 5 illustrates a portion of still another plane, in accordance with embodiments of the present invention.

FIG. 5 illustrates a plan view of a portion of a plane 500, in accordance with embodiments of the present invention. Plane 400 may be, for example, a plane for distributing ground, Vss, or operating power, Vdd, or other widely used voltage or signal. Plane 500 may be, for example, a plane for distributing ground, Vss, or operating power, Vdd, or other widely used voltage or signal. In general, plane 500 is adjacent to plane 400 (FIG. 4) and provides for complementary signals. For example, if plane 400 is a power plane, plane 500 may be a Vss (ground) plane. In FIG. 5, dark or shaded areas represent metal and light areas represent no metal. Planes 400 (FIG. 4) and 500 are generally vertically aligned in an integrated circuit. Plane 500 is formed in a metallization layer of an integrated circuit, in accordance with a graphical pattern made up of tiles arrayed in a rectilinear mesh or grid. Plane 500 comprises a plurality of instances of a variety of tile shapes, including tile 210.

In addition to tiles 210, plane 500 comprises tiles 510 and 520. In general, tiles 510 and 520 may be formed by removing metal from the pattern of tile 210. It is also appreciated that certain of these tiles have image relationships with other tiles. For example, tiles 510 and 520 may be mirror images.

Plane 500 further comprises tiles 530. Instances of tile 530 "straddle" projection 560 of trace 460 on plane 400 (FIG. 4). In conjunction with vias to metal areas of plane 400, tile 530 severs as a bridge or jumper to electrically couple portions 401 and 402 of plane 400 (FIG. 4). In this novel manner, the deleterious effects of separating portions 401 and 402 of plane 400, described above, may be mitigated or "healed." Instances 501, 502 and 503 of tile 210 will be referenced in further detail in FIG. 6, below.

Figure 6:
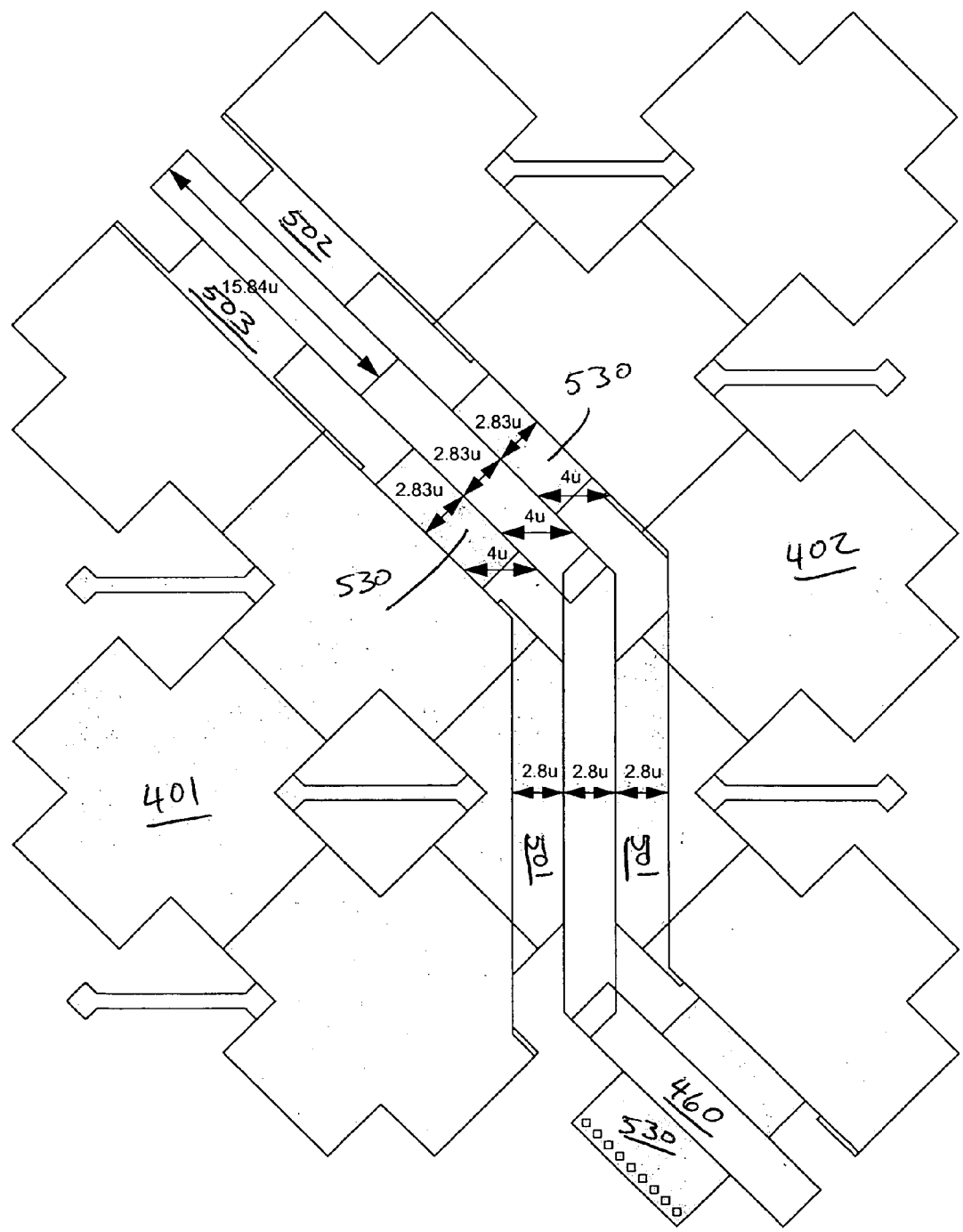
FIG. 6 illustrates a plan view of the planes of FIGS. 4 and 5 showing the alignment of the two planes, in accordance with embodiments of the present invention.

FIG. 6 illustrates a plan view of plane 400 (FIG. 4) and plane 500 (FIG. 5) showing the alignment of the two planes, in accordance with embodiments of the present invention. The majority of the material illustrated is a part of plane 400, for example, plane segments 401 and 402. In addition, trace 460 is visible.

Portions of some features of plane 500 (FIG. 5) are visible. For example, portions of two instances of tile 530 are visible. In addition, a portion of tile instance 501 is visible through wiring channel 470 (FIG. 4). Further, portions of tile instances 502 and 503 are also visible through wiring channel 470.

Figure 7:
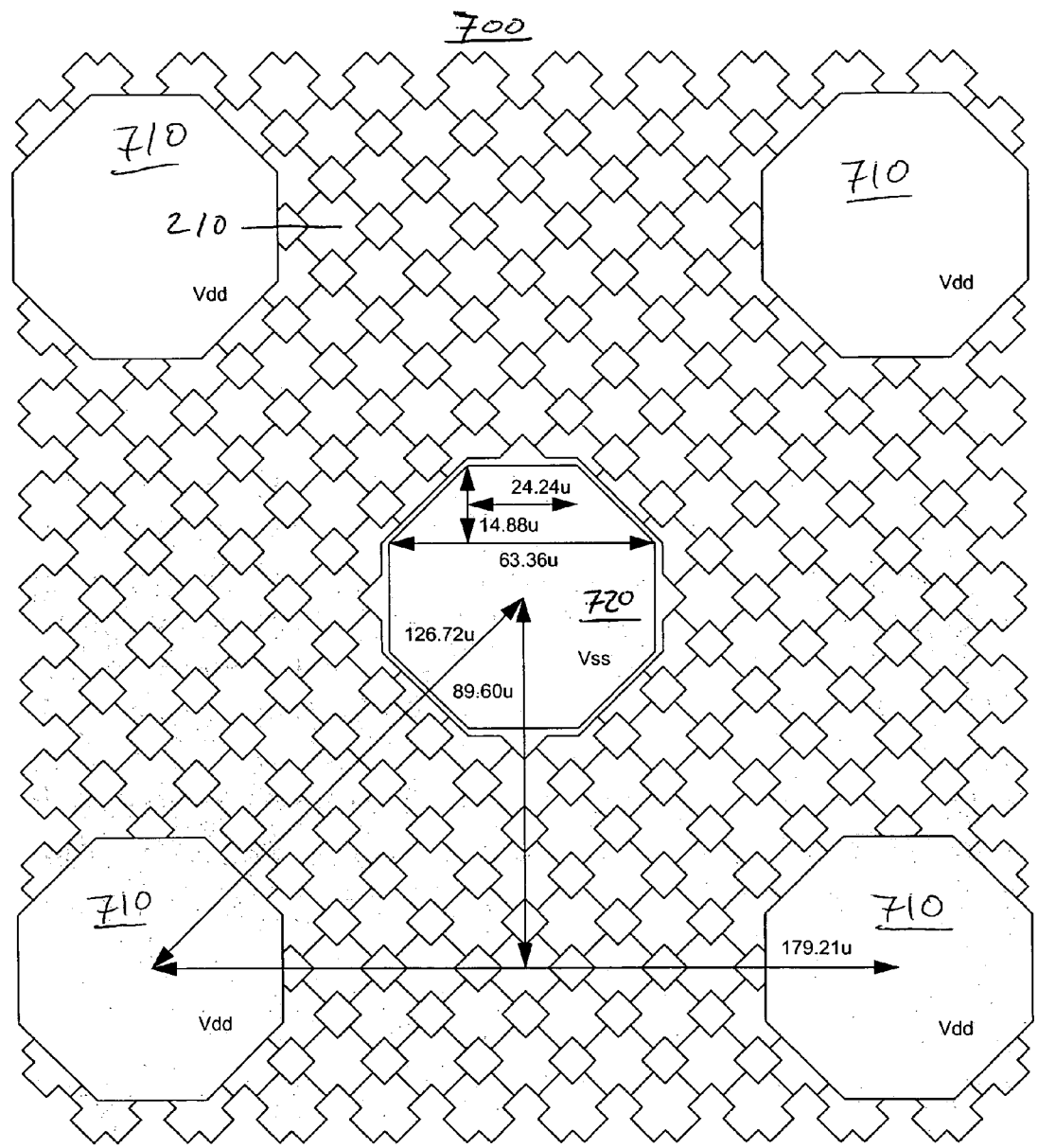
FIG. 7 illustrates a portion of still yet another plane, in accordance with embodiments of the present invention.

FIG. 7 illustrates a plan view of a portion of a plane 700, in accordance with embodiments of the present invention. Plane 700 may be, for example, a plane for distributing ground, Vss, or operating power, Vdd, or other widely used voltage or signal. In the embodiment of FIG. 7, the plane is a Vdd plane. In FIG. 7, dark or shaded areas represent metal and light areas represent no metal. Plane 700 is formed in a top metallization layer of an integrated circuit, in accordance with a graphical pattern made up of tiles arrayed in a rectilinear mesh or grid. Plane 700 comprises a plurality of instances of a variety of tile shapes, including tile 210. Exemplary dimensions are shown as indicated.

Plane 700 further comprises a plurality of instances metallization 710 for accommodating BGA solder balls. Metallization 710 may comprise a single large tile or multiple tiles. Metallizations 710 are embedded in the mesh and short to it. In addition, plane 700 comprises a variety of regularly sized tiles to accommodate metallization 710. Such tiles may be, for example, modified versions of tile 210 (FIG. 2).

Plane 700 also illustrates a metallization 720 for a Vss solder ball. Metallization 720 is isolated from the grid pattern of plan 700, and couples to another metal layer, typically the next lower layer, by means of vias under the pad (not shown).

In accordance with embodiments of the present invention, the pattern of ball pads (metallizations 710 and 720) is an integer multiple of the mesh pattern.

Figure 8:
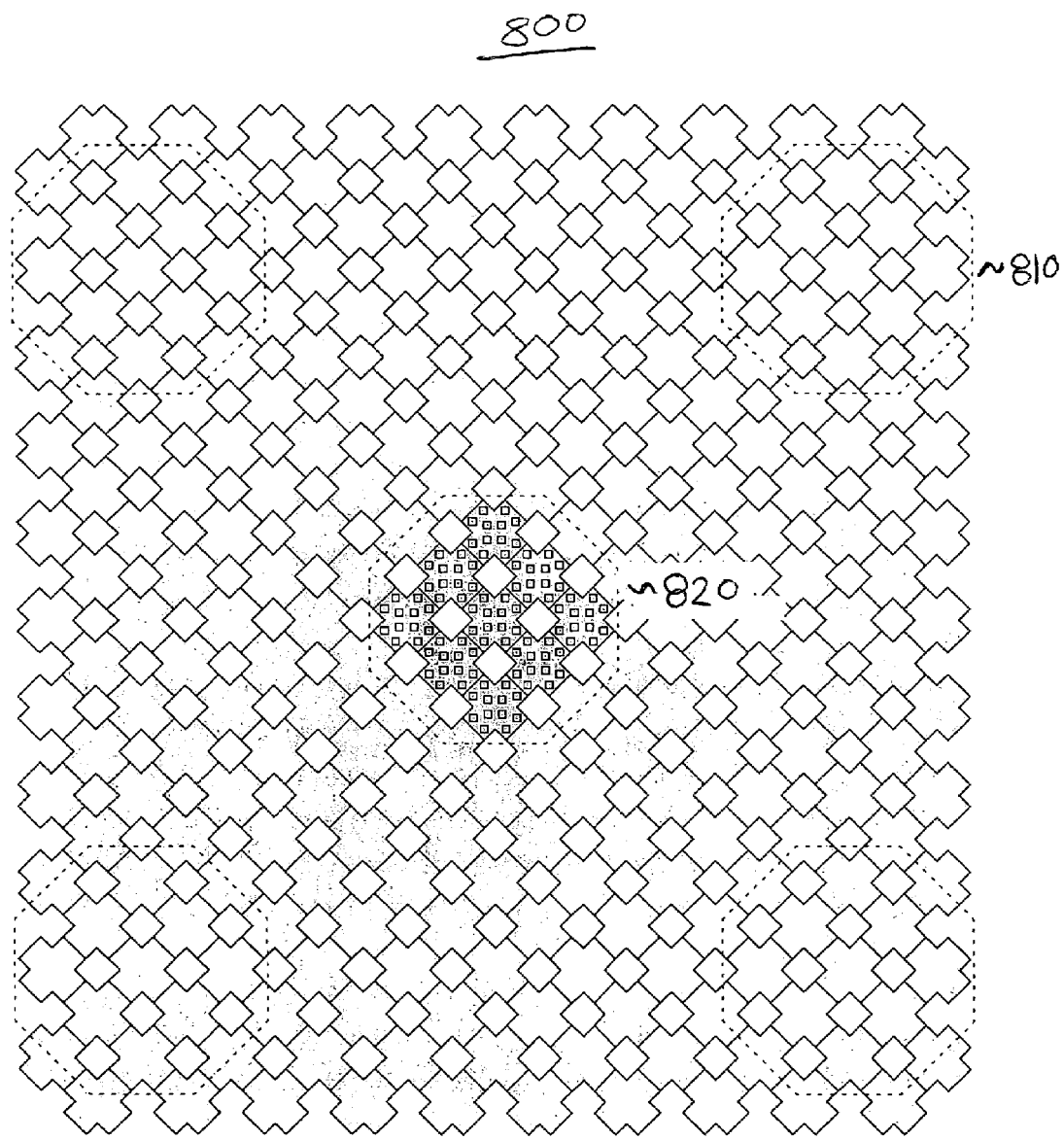
FIG. 8 illustrates a portion of a plane, in accordance with embodiments of the present invention.

FIG. 8 illustrates a plan view of a portion of a plane 800, in accordance with embodiments of the present invention. Plane 800 may be, for example, a plane for distributing ground, Vss, or operating power, Vdd, or other widely used voltage or signal. In the embodiment of FIG. 8, the plane is a Vss plane. In FIG. 7, dark or shaded areas represent metal and light areas represent no metal. In the embodiment of FIG. 8, plane 800 is formed in a next to top metallization layer of an integrated circuit, in accordance with a graphical pattern made up of tiles arrayed in a rectilinear mesh or grid. Plane 800 comprises a plurality of instances of a variety of tile shapes, including tile 210.

FIG. 8 illustrates a projection 810 of metallization 710 (FIG. 7) and a projection 820 of metallization 720 (FIG. 7). Within projection 820 are a plurality of vias for coupling metallization 720 to plane 800.

Figure 9:
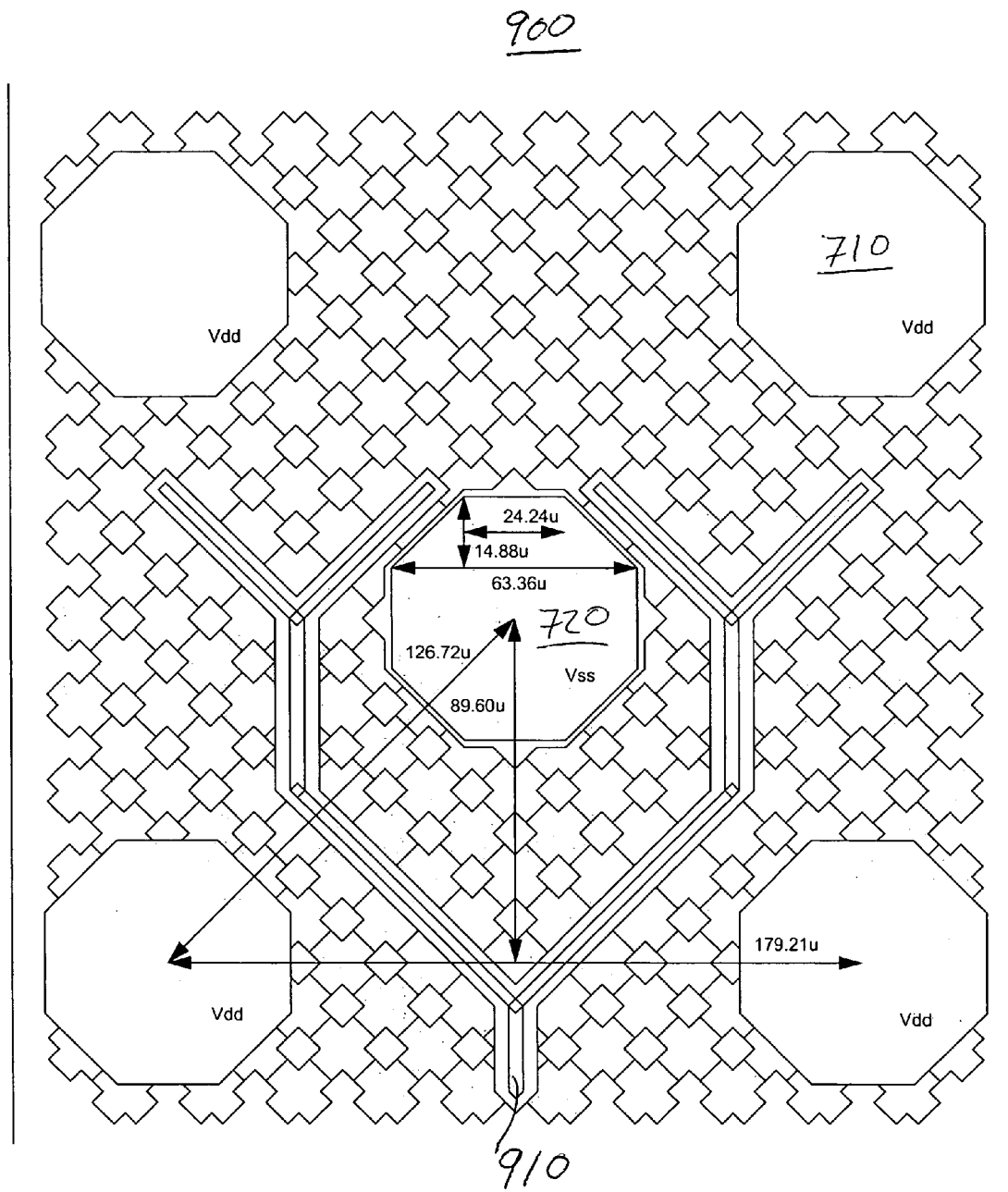
FIG. 9 illustrates a portion of another plane, in accordance with embodiments of the present invention.

FIG. 9 illustrates a plan view of a portion of a plane 900, in accordance with embodiments of the present invention. Plane 900 may be, for example, a plane for distributing ground, Vss, or operating power, Vdd, or other widely used voltage or signal. In the embodiment of FIG. 9, the plane is a Vdd plane. In FIG. 9, dark or shaded areas represent metal and light areas represent no metal. Plane 900 is formed in a top metallization layer of an integrated circuit, in accordance with a graphical pattern made up of tiles arrayed in a rectilinear mesh or grid. Plane 900 comprises a plurality of instances of a variety of tile shapes, including tile 210. Exemplary dimensions are shown as indicated.

FIG. 9 further illustrates an exemplary portion 910 of a clock tree distribution network, in accordance with embodiments of the present invention. A larger than normal fraction of orthogonal segments is shown to illustrate branching and bending. It is appreciated that clock tree portion 910 is electrically isolated from Vdd portions of plane 900, as well as Vss portions of plane 900. Clock tree portion 910 is generally constructed as taught in FIGS. 1-6.

Figure 10:
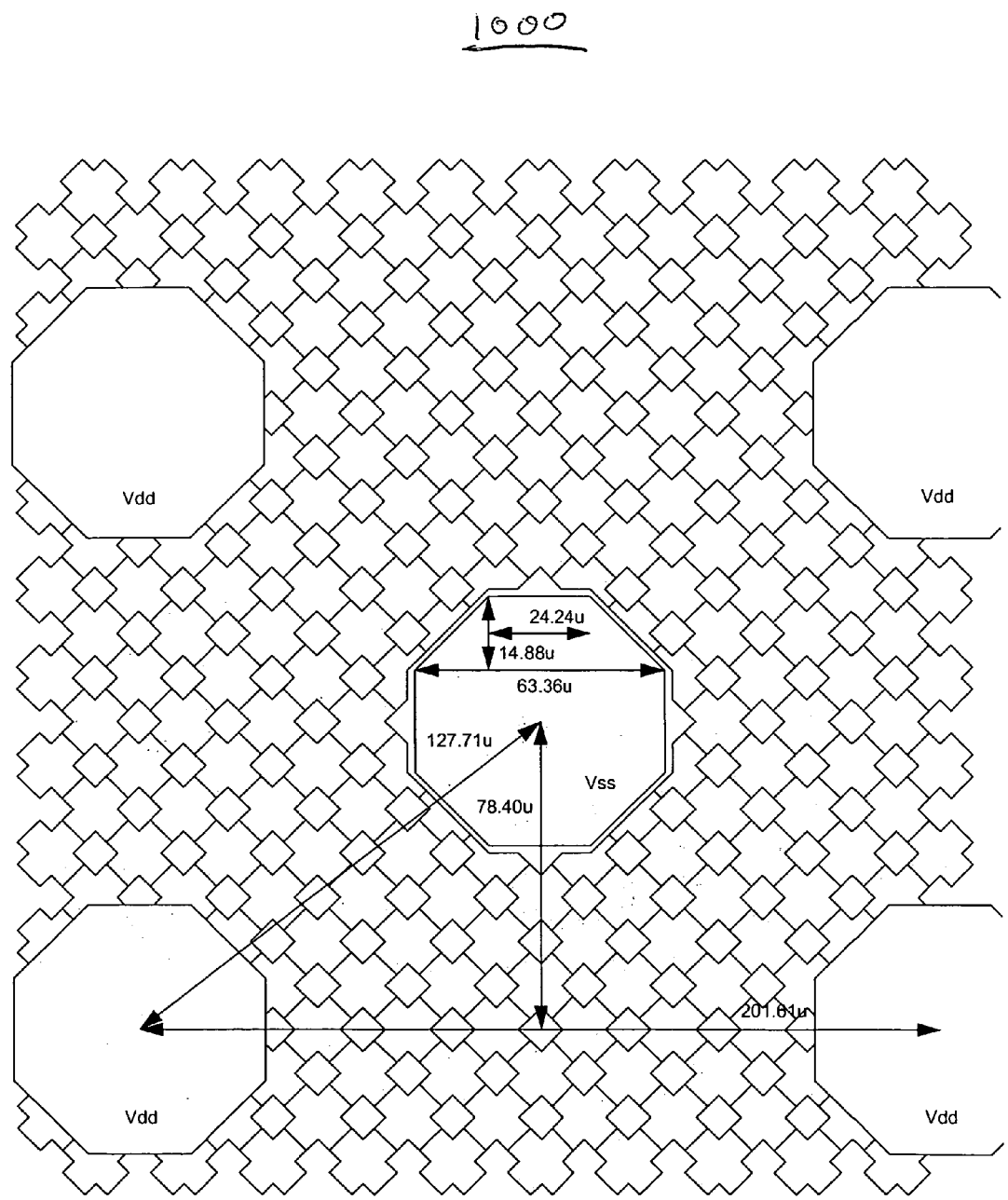
FIG. 10 illustrates a portion of yet another plane, in accordance with embodiments of the present invention.

FIG. 10 illustrates a plan view of a portion of a plane 1000, in accordance with embodiments of the present invention. Plane 1000 may be, for example, a plane for distributing ground, Vss, or operating power, Vdd, or other widely used voltage or signal. In the embodiment of FIG. 10, the plane is a Vdd plane. In FIG. 10, dark or shaded areas represent metal and light areas represent no metal. Plane 1000 is formed in a top metallization layer of an integrated circuit, in accordance with a graphical pattern made up of tiles arrayed in a rectilinear mesh or grid. Plane 1000 comprises a plurality of instances of a variety of tile shapes, including tile 210. Exemplary dimensions are shown as indicated.

In accordance with alternative embodiments of the present invention, the aspect ratio of the bump diamond can be chosen independently of the power mesh diamond. Bump pitch can be spread along the X- or Y-axis so as to increase bump density or alter the aspect ration of the clock distribution region. The power mesh diamond can be left at 45 degrees to support octilinear routing and honor design rule restrictions for wire orientations.

Thus, embodiments in accordance with the present invention facilitate efficient and effective clock signal and power distribution while minimizing delays and skews. Present invention diagonal clock signal distribution routes reduce relative distance from the driver to the endpoint compared to traditional non-diagonal clock signal distribution routes. Embodiments of the present invention also facilitate maximized placement of clock signal distribution routes in a single metal layer (e.g., a top metal layer) while providing for a more uniform electrical medium with less overall parasitic capacitance. The present invention offset diagonal clock signal distribution tree also facilitates minimized doubling back in clock distribution paths and convenient avoidance of other components included in a metal layer.

Embodiments in accordance with the present invention provide systems and methods of double diamond clock and power distribution. Additional embodiments in accordance with the present invention provide for non-rectilinear double diamond signal routing and power distribution in a rectilinear mesh. Further embodiments in accordance with the present invention provide systems and methods of double diamond clock and power distribution that are compatible and complimentary with conventional integrated circuit layout systems and methods are highly desired.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An integrated circuit comprising:
a first metallization layer that is substantially a power plane;
a second metallization layer;
wherein said first metallization layer and said second metallization layer are separated by an inter-plane distance; and
a signal trace on said first metallization layer separated from said power plane by about three times said inter-plane distance.

2. An integrated circuit of claim 1 comprising a plurality of metallization layers and wherein said first metallization layer is a top most metallization layer of said plurality of metallization layers.

3. An integrated circuit of claim 1 wherein a width of said signal trace is about three times said inter-plane distance.

4. An integrated circuit of claim 1 wherein a thickness of said first metallization layer is about said inter-plane distance.

5. An integrated circuit of claim 4 wherein said first metallization layer comprises Aluminum.

6. An integrated circuit of claim 5 wherein said second metallization layer comprises Copper.

7. An integrated circuit of claim 1 wherein said first metallization layer comprises pads disposed to accept package solder balls.

8. An integrated circuit of claim 1 wherein said signal trace is substantially non-parallel to an edge of said integrated circuit and wherein a rectilinear component of said width of said signal trace is an integer multiple of a grid granularity used in a layout of said integrated circuit.

9. An integrated circuit of claim 1 wherein said first metallization layer comprises first and second non-overlapping regions, and wherein said first region comprises said power plane and said second region comprises said signal trace.

10. An integrated circuit of claim 1 wherein no other metallization layer separates said first metallization layer and said second metallization layer.

11. An integrated circuit comprising:
a first substantially continuous metal plane disposed in a first metallization layer for conducting first power to elements of said integrated circuit;
a second substantially continuous metal plane disposed in a second metallization layer for conducting second power to elements of said integrated circuit;
wherein said first and second metallization layers are vertically adjacent;
wherein said first and second substantially continuous metal planes comprise stripes that are substantially non-parallel to an edge of said integrated circuit; and
wherein said first substantially continuous metal plane comprises a signal trace that is electrically isolated from said first power.

12. An integrated circuit of claim 11 wherein said second substantially continuous metal plane comprises a plurality of structures to heal interruptions in said first substantially continuous metal plane.

13. An integrated circuit of claim 11 wherein said signal trace comprises a segment substantially parallel to said stripes.

14. An integrated circuit of claim 11 wherein said first substantially continuous metal plane comprises pads disposed to accept package solder balls.

15. An integrated circuit of claim 11 wherein said signal trace is separated from said first substantially continuous metal plane by a dimension about the size its width of said signal trace.

16. An integrated circuit comprising:
a first metallization layer wherein the majority of metallization of said first metallization layer is electrically continuous at a first power potential;
a second metallization layer wherein the majority of metallization of said second metallization layer is electrically continuous at a second power potential;
a third metallization layer wherein the majority of metallization of said third metallization layer comprises a plurality of signal traces, wherein a majority of said signal traces are electrically isolated from one another;
wherein said first metallization layer and said second metallization layer comprise stripes that are substantially non-parallel to an edge of said integrated circuit;

wherein said stripes are at least 2 times the plan view width of said signal traces; and wherein said first metallization layer comprises a wiring trace that is eclectically isolated from said first power potential.

17. An integrated circuit of claim 16 wherein said second metallization layer comprises a plurality of structures to heal interruptions in said majority of metallization of said first metallization layer.

18. An integrated circuit of claim 17 wherein at least one of said plurality of structures is vertically aligned with said wiring trace.

19. An integrated circuit of claim 18 wherein at least one of said plurality of structures is electrically coupled to said first power potential.

20. An integrated circuit of claim 16 wherein said first metallization layer comprises pads disposed to accept package solder balls.

21. An integrated circuit of claim 16 wherein said wiring trace is separated from said first power potential by a dimension about the width of said wiring trace.

* * * * *